United States Patent Office 3,454,602
Patented July 8, 1969

3,454,602
PROCESS FOR THE PREPARATION OF 1,2,3,6-TETRAHYDRO - 3,6 - ENDO-METHANO-3,4,5,6,7,7-HEXABROMOPHTHALIC ANHYDRIDE
Jerome A. Gourse, Chicago, Ill., assignor to Velsicol Chemical Corporation, Chicago, Ill., a corporation of Illinois
No Drawing. Continuation of application Ser. No. 622,447, Mar. 13, 1967. This application Sept. 6, 1968, Ser. No. 760,117
Int. Cl. C07c 61/12
U.S. Cl. 260—346.6     9 Claims

ABSTRACT OF THE DISCLOSURE

A process for preparing 1,2,3,6-tetrahydro-3,6-endomethano - 3,4,5,6,7,7 - hexabromophthalic anhydride by reacting hexabromocyclopentadiene and maleic anhydride at a temperature between about 120 degrees C. and about 160 degrees C. in a halogenated aliphatic solvent.

This is a continuation of Ser. No. 622,447, filed Mar. 13, 1967.

1,2,3,6 - tetrahydro-3,6-endomethano-3,4,5,6,7,7-hexabromophthalic anhydride, hereinafter referred to as "bromendic anhydride," is a highly valuable chemical. It can be used for functions served by 1,2,3,6-tetrahydro-3,6 - endomethano - 3,4,5,6,7,7-hexachlorophthalic anhydride, commonly referred to as "chlorendic anhydride."

In particular, it is useful in the preparation of polyesters, including the preparation of oil-modified polyesters and cross-linked polyesters. For example, United States Patent No. 2,606,910 discusses the fact that chlorendic anhydride is a desirable intermediate in the preparation of alkyd (polyester)-type resins. United States Patents No. 2,779,700 and 2,779,701, show that the use of chlorendic anhydride in the preparation of polyester resinous compositions includes the "hexahalocyclopentadiene adducts of maleic anhydride," encompassing bromendic anhydride.

Furthermore, United States Patent No. 3,106,536 discloses the use of epoxyesters of 1,4,5,6,7,7-hexahalobicyclo - [2.2.1] - 5-heptenecarboxylate including, specifically, di(3,4 - epoxybutyl)-1,4,5,6,7,7-hexabromobicyclo-[2.2.1]-5-heptene-2,3-dicarboxylate. This patent further points out that its products can be prepared from the corresponding acid; e.g., bromendic acid, by standard esterification procedures, and that the esterification products are useful in preparing an insoluble infusible, fire-resistant product by reaction with an epoxy curing agent such as phenyldiamine.

Also, British patent specification No. 1,031,407, discloses that hexabromoendomethylenetetrahydrophthalic acid is suitable for use in preparing polyesters by reaction with selected condensable phosphorous-containing compounds, other carboxylic acids and one or more polyhydroxy compounds. According to this patent, the polyester can be further reacted with dicyclopentadiene to obtain an improved polyester resin suitable for the manufacture of fire-retardant shaped bodies and coatings having good mechanical and electrical properties as well as light color.

The principal procedure for the preparation of chlorendic anhydride involves performing the reaction of hexachlorocyclopentadiene and maleic anhydride in an inert aromatic solvent. Unfortunately, it has been found that this procedure when applied to the preparation of bromendic anhydride by the reaction of hexabromocyclopentadiene and maleic anhydride, results in a product contaminated with decomposition products to an extent substantially preventing its commercial usefulness due to its black color and the need for extensive purification.

These difficulties in the preparation of bromendic anhydride of light color and high purity can be eliminated and bromendic anhydride can be prepared in high yields by the present process. This procedure requires reacting hexabromocyclopentadiene and maleic anhydride at a temperature between about 120° C. and about 160 C. in a halogenated aliphatic solvent.

The use of temperatures below about 120° C. does not permit the reaction to proceed at a reasonable rate and does not result in the desired yield. Temperatures higher than the specified temperatures can cause degradation of the hexabromocyclopentadiene and prevent recovery of a useful product without extensive purification.

Various halogenated aliphatic solvents can be used. Since it is desirable to perform this reaction at atmospheric pressure, it is preferred that the halogenated aliphatic solvent have a boiling point range of between about 120° C. and about 160° C. Useful solvents include:

tetrachloroethane
tribromomethane
chloro iodo ethane
chloro nitro propane
dibromopropane
dichlorobutane
dichloronitroethane
1,2-dichloropentane
heptyl chloride
hexyl chloride
trichlorobromoethane
valeryl chloride
amyl bromide-1
sec butyl iodide
chloro nitro ethane
dibromobutane
dichlorobromoethane
dichlorodibromomethane
dichloroiodomethane
dichloronitropropane
2,4-dichloropentane
hexyl bromide
pentachloroethane
trichloropropane The following examples illustrate the performance of the present process.

Example 1

Hexabromocyclopentadiene (270 grams; 0.5 mol), maleic anhydride (49 grams: 0.5 mol) and tetrachloroethane (100 ml.) were placed in a three-neck glass reaction flask equipped with stirrer, condenser, thermometer and gas inlet tube. Nitrogen gas was passed through the reaction mixture by means of the gas inlet tube at a rate of about 700 ml. per minute. The reaction mixture was maintained at a temperature of about 137–143° C. for 6 hours with continuous stirring. After cooling, the solid product, bromendic anhydride, was filtered, washed with hexane and dried under vacuum. The weight of the light colored product was 214 grams, representing a yield of 67 percent of the theoretical amount.

Example 2

Hexabromocyclopentadiene (270 grams; 0.5 mol) maleic anhydride (49 grams; 0.5 mol) and tetrachloroethane (50 ml.) were placed in a three neck glass reaction flask equipped with stirrer, condenser, thermometer and gas inlet tube. Nitrogen gas was passed through the reaction mixture by means of the gas inlet tube at a rate of abou 700 ml. per minute. The reaction mixture was maintained at a temperature of about 150° C. for 6.5 hours with continuous stirring. After cooling, heptane was added and the solid product, bromendic anhydride, was recovered by filtration and dried under vacuum. The weight of the light colored product was 313 grams, representing a yield of 98 percent of the theoretical amount.

Example 3

Hexabromocyclopentadiene (68 grams; 0.125 mol), maleic anhydride (12.5 grams; 0.125 mol) and tetrachloroethane (12.5 ml.) were placed in a three neck glass reaction flask equipped with stirrer, condenser and thermometer. The reaction mixture was maintained at a temperature of about 150° C. for 3 hours with continuous stirring. The solid product, bromendic anhydride, was recovered by filtration and dried under vacuum. The weight of the light colored product was 71 grams, representing a yield of 88.7 percent of the theoretical amount.

Example 4

Hexabromocyclopentadiene (270 grams; 0.5 mol), maleic anhydride (49 grams; 0.5 mol) and tribromomethane (150 ml.) are placed in a three neck glass reaction flask equipped with stirrer, condenser and thermometer. The reaction mixture is maintained at a temperature of about 150° C. for 4 hours with continuous stirring. The solid product, bromendic anhydride, was recovered by filtration and dried under vacuum.

Example 5

Hexabromocyclopentadiene (270 grams; 0.5 mol), maleic anhydride (49 grams; 0.5 mol) and dichloro-1-bromomethane (150 ml.) are placed in a three neck glass reaction flask equipped with stirrer, condenser and thermometer. The reaction mixture is maintained at a temperature of about 150° C. for 4 hours with continuous stirring. The solid product, bromendic anhydride, was recovered by filtration and dried under vacuum.

Example 6

Hexabromocyclopentadiene (270 grams; 0.5 mol), maleic anhydride (49 grams; 0.5 mol) and pentachloroethane (150 ml.) are placed in a three neck glass reaction flask equipped with stirrer, condenser and thermometer. The reaction mixture is maintained at a temperature of about 150° C. for 4 hours with continuous stirring. The solid product, bromendic anhydride, was recovered by filtration and dried under vacuum.

Example 7

Hexabromocyclopentadiene (270 grams; 0.5 mol), maleic anhydride (49 grams; 0.5 mol) and trichlorobromoethane (150 ml.) are placed in a three neck glass reaction flask equipped with stirrer, condenser and thermometer. The reaction mixture is maintained at a temperature of about 150° C. for 4 hours with continuous stirring. The solid product, bromendic anhydride, was recovered by filtration and dried under vacuum.

While super atmospheric pressures can be utilized since reactants are not utilized as in the gaseous phase, it is preferred to operate the process at about atmospheric pressure.

The optimum amount of the halogenated aliphatic solvent will vary with the precise reaction conditions and the identity of the solvent. It is preferred to minimize the amount so as to prevent unnecessary dilution of the system, to prevent reduction in the rate of reaction and to prevent unnecessary solvent usage and recovery.

I claim:
1. A process for the preparation of 1,2,3,6-tetrahydro-3,6 - endomethano - 3,4,5,6,7,7-hexabromophthalic anhydride which comprises reacting hexabromocyclopentadiene and maleic anhydride at a temperature between about 120° C. and 160° C. in a halogenated aliphatic solvent having a boiling point range of between about 120° C. and about 160° C.

2. The process of claim 1 wherein the pressure is about atmospheric.

3. The process of claim 1 wherein the hexabromocyclopentadiene and the maleic anhydride are introduced in about equimolar amounts.

4. The process of claim 1 wherein the reaction time is at least about 2 hours.

5. The process of claim 1 wherein the solvent is tetrachloroethane.

6. The process of claim 1 wherein the solvent is tribromomethane.

7. The process of claim 1 wherein the solvent is dichlorobromoethane.

8. The process of claim 1 wherein the solvent is pentachloroethane.

9. The process of claim 1 wherein the solvent is trichlorobromomethane.

References Cited

UNITED STATES PATENTS 2,606,910   8/1952   Herzfeld et al. _____ 260—346.6

ALEX MAZEL, *Primary Examiner.*

BERNARD I. DENTZ, *Assistant Examiner.*